United States Patent
Tiger et al.

(10) Patent No.: US 9,674,149 B2
(45) Date of Patent: Jun. 6, 2017

(54) SYSTEM AND METHOD FOR ESTABLISHING A VIRTUAL PRIVATE NETWORK OF A MOBILE DEVICE THROUGH A PREFERRED NETWORK

(71) Applicant: Facebook, Inc., Menlo Park, CA (US)

(72) Inventors: Roi Tiger, Tel Aviv (IL); Gadi Elishayov, Tel Aviv (IL); Eran Friedman, Neve Yarak (IL); Lior Tubi, Rishon Lezion (IL)

(73) Assignee: FACEBOOK, INC., Menlo Park, CA (US)

( * ) Notice: Subject to any disclaimer, the term of this patent is extended or adjusted under 35 U.S.C. 154(b) by 560 days.

(21) Appl. No.: 14/207,457

(22) Filed: Mar. 12, 2014

(65) Prior Publication Data

US 2014/0280797 A1    Sep. 18, 2014

Related U.S. Application Data (60) Provisional application No. 61/778,782, filed on Mar. 13, 2013.

(51) Int. Cl.
| | |
|---|---|
| *G06F 15/177* | (2006.01) |
| *H04L 29/06* | (2006.01) |
| *H04L 12/24* | (2006.01) |

(52) U.S. Cl.
CPC ...... *H04L 63/0272* (2013.01); *H04L 41/0886* (2013.01)

(58) Field of Classification Search
CPC .................. H04L 41/0886; H04L 63/0272
USPC .......................................................... 709/220
See application file for complete search history.

(56) References Cited

U.S. PATENT DOCUMENTS

| | | | | |
|---|---|---|---|---|
| 6,308,273 | B1* | 10/2001 | Goertzel | G06F 21/6218 726/2 |
| 7,437,457 | B1* | 10/2008 | Eisendrath | H04L 63/10 709/204 |
| 2008/0052395 | A1* | 2/2008 | Wright | H04L 63/20 709/224 |
| 2009/0307522 | A1* | 12/2009 | Olson | G06F 11/2007 714/4.1 |
| 2010/0153696 | A1* | 6/2010 | Beachem | G06F 9/4406 713/2 |
| 2013/0215740 | A1* | 8/2013 | Tse | H04L 41/0806 370/228 |

(Continued)

*Primary Examiner* — Imad Hussain (57) ABSTRACT

A system and method may handle the supervision of the connectivity of a virtual private network (VPN) of a mobile device that is configured to connect through a plurality of network interfaces. A server may configure the mobile device to send a request for data item. The server may track the response of the mobile device to the request. According to one embodiment, the VPN may not be connected through a preferred network interface, while such interface is available. In such case, the data item may be routed through the preferred network and therefore not received by the VPN server within a predetermined period of time. According to another embodiment, the server may identify an internal IP address of the data item. The server may be configured to determine the current network interface based on the internal IP address. The server may disconnect the VPN to permit the VPN to reconnect through the preferred network interface.

19 Claims, 8 Drawing Sheets

(56) References Cited

U.S. PATENT DOCUMENTS

| | | | |
|---|---|---|---|
| 2013/0219465 A1* | 8/2013 | Tse | H04L 63/10 726/3 |
| 2014/0068750 A1* | 3/2014 | Tjahjono | H04L 63/029 726/15 |
| 2014/0086146 A1* | 3/2014 | Kim | H04W 28/02 370/328 |

* cited by examiner

SYSTEM AND METHOD FOR ESTABLISHING A VIRTUAL PRIVATE NETWORK OF A MOBILE DEVICE THROUGH A PREFERRED NETWORK

RELATED APPLICATIONS

This application claims the benefit of priority under 35 U.S.C. §119(e) to U.S. Provisional Application No. 61/778,782 filed on Mar. 13, 2013, which is hereby incorporated by reference in its entirety.

BACKGROUND

A virtual private network, known as a VPN, is a private network that uses a public network, such as the internet, to connect between remote sites or users. As an example, VPN may enable a connection to a business's private network from an employee device. Some techniques may provide the ability to connect to a VPN through a wireless network, a cellular network, or a wired network, for example. The cellular network may be code division multiple accesses (CDMA), global system for mobile communications (GSM), 3rd generation mobile telecommunications (3G), long-term evolution (LTE) cellular network, and the like.

While searching for an available network, a VPN connection may be established through an optimal network interface. A problem may occur when a user desires to change between one network interface to another network interface. Occasionally, an attempt to preserve the VPN connection while switching to another network interface may fail. Furthermore, when the user desires to switch to another network interface, the VPN connection may preserve the connectivity to a first network interface identified even if such interface is not optimal. It would therefore be advantageous to overcome the limitations of the prior art by providing an effective way to preserve the VPN connection to an efficient network interface. It would be further advantageous if such a solution will enable supervision of the VPN connection to a preferred network interface.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to a system and method that may handle the supervision of the connectivity of a virtual private network (VPN) of a mobile device that is configured to connect through a plurality of network interfaces. A server may configure the mobile device to send a request for a data item. The server may track the response of the mobile device to the request. According to one embodiment, the VPN may not be connected through a preferred network interface, while such interface is available. In such case, the data item may be routed through the preferred network and therefore not received by the VPN server within a predetermined period of time. According to another embodiment, the server may identify an internal IP address of the data item. The server may be configured to determine the current network interface based on the internal IP address. The server may disconnect the VPN to permit the VPN to reconnect through the preferred network interface. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various embodiments are generally directed to a system and method that may handle the supervision of the connectivity of a virtual private network (VPN) of a mobile device that is configured to connect through a plurality of network interfaces. A server may configure the mobile device to send a request for data item. The server may track the response of the mobile device to the request. According to one embodiment, the VPN may not be connected through a preferred network interface, while such interface is available. In such case, the data item may be routed through the preferred network and therefore not received by the VPN server within a predetermined period of time. According to another embodiment, the server may identify an internal IP address of the data item. The server may be configured to determine the current network interface based on the internal IP address. The server may disconnect the VPN to permit the VPN to reconnect through the preferred network interface. Other embodiments are described and claimed.

Figure 1:
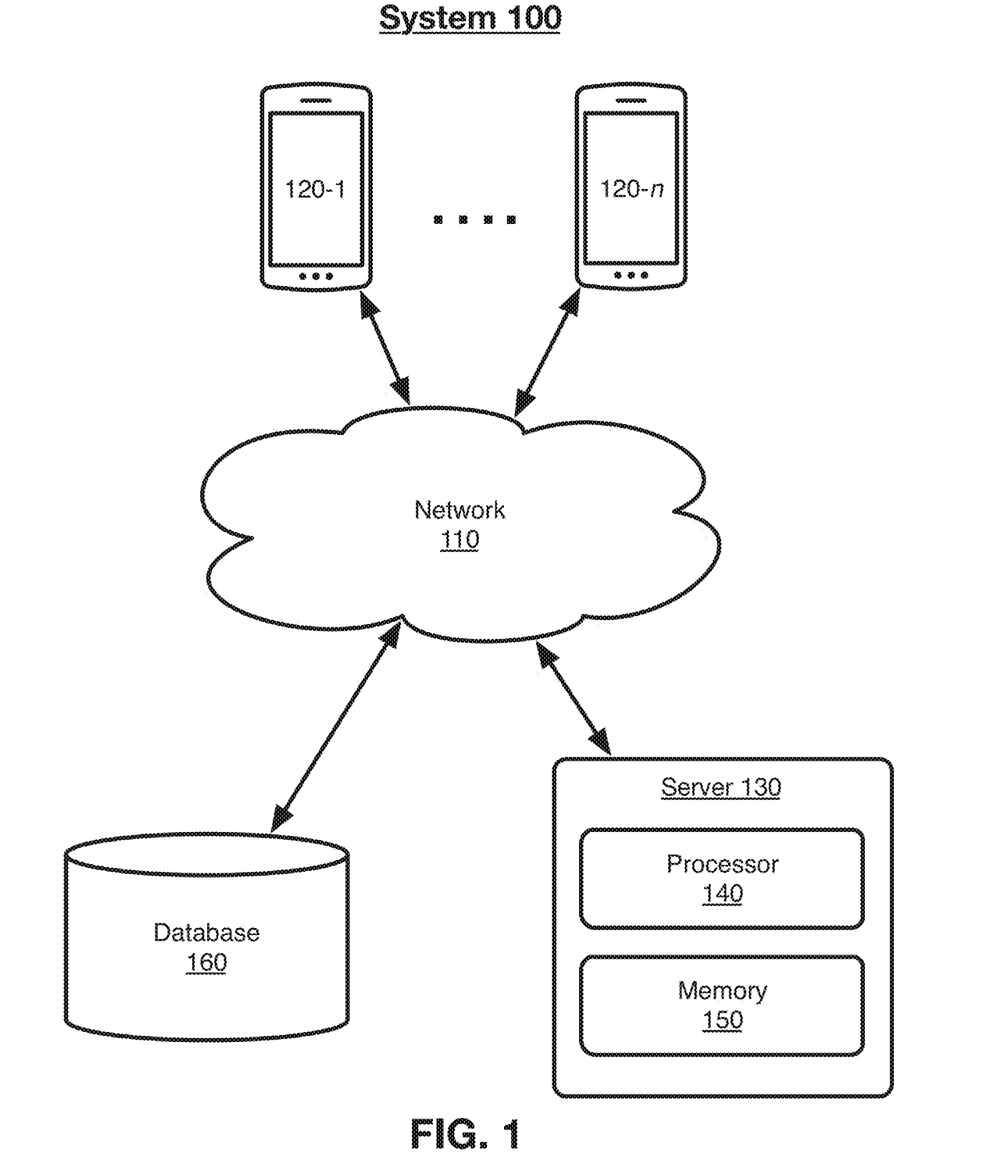
FIG. 1 illustrates an embodiment of a system.

FIG. 1 is an exemplary and non-limiting schematic diagram of a system 100 for establishment of a VPN connection of a mobile device through a preferred network interface according to one embodiment. Several components may be connected to a network 110 to comprise the system 100. In an embodiment, the network 110 may be a wireless network, a cellular network, or a wired network. Examples for the cellular network may include CDMA, GSM, 3G, LTE, and the like. The system 100 may include one or more mobile devices 120, i.e., 120-1 through 120-*n*, which may be communicatively connected to the network 110. Each mobile device 120 may be, but not limited to, a tablet personal computer (PC) or a smartphone, for example. The system 100 may also include a database 160, which may be used to maintain information associated with each mobile device 120. According to an embodiment, a server 130 may also be communicatively connected to the network 110. The server 130 may contain several components such as a processor, or processing unit 140, and a memory 150. The memory 150 may contain instructions executed by the processor 140. The server 130 may be used to supervise the VPN connection of a mobile device 120, for example, mobile device 120-1. The server 130 may further be used to monitor traffic of one or more data items transmitted through the VPN connection of the mobile device 120-1. Further, the server 130 may be configured to establish the VPN connection through the network 110 upon a request of the mobile device 120-1. The server 130 may be configured to identify if there a plurality of network interfaces available for example, a wireless network such as, Wi-Fi or 3G.

According to one embodiment, the server 130 may configure the mobile device 120-1 to send a request for a data item respective of the VPN connection through a current network interface. According to this embodiment, the server 130 may cause the mobile device 120-1 to use a proxy auto-configuration file (PAC) when searching for at least one proxy as a result of the request for the data item. Further, the server 130 may be configured to track the response of the mobile device 120-1 to the request. The server 130 may receive the data item accompanied by an IP address generated through a domain name system (DNS). The IP address, which may be the result of a DNS request that is translated into an IP address by a server, may be updated each time the data item is received to prevent caching. When the data item is received, the server 130 may determine that the mobile device 120-1 is currently connected to the network 110 through a preferred network interface, for example, 3G. However, when the data item is not received within a predetermined period of time, the server 130 may determine that the current connection of mobile device 120-1 to the network 110 is not implemented through the preferred network interface, for example, Wi-Fi. The server 130 is configured to disconnect the VPN from the network 110 to permit the VPN to reconnect to the preferred network interface. Furthermore, the server 130 may be configured to store the received data item and a type of the network interface through which the data item is sent in the database 160 for further use.

According to another embodiment, when the server 130 tracks traffic of one or more data items transmitted through the VPN connection, the data items may be analyzed to determine the type of the current network interface. Such analysis may include identification of an IP address associated with each of the data items, and more specifically identification of an internal IP address. The internal IP address may be changed respective of the type of network interface through which the data item is sent. Therefore, the identification of the internal IP address may imply on the type of current network interface that the mobile device 120-1 is connected to. As described herein, when the current network interface is not the preferred network interface, the server 130 may disconnect the VPN to permit the VPN to reconnect to the preferred network interface. The server 130 may store the IP address, and more specifically, the internal IP address, in the database 160 for further use.

Figure 2:
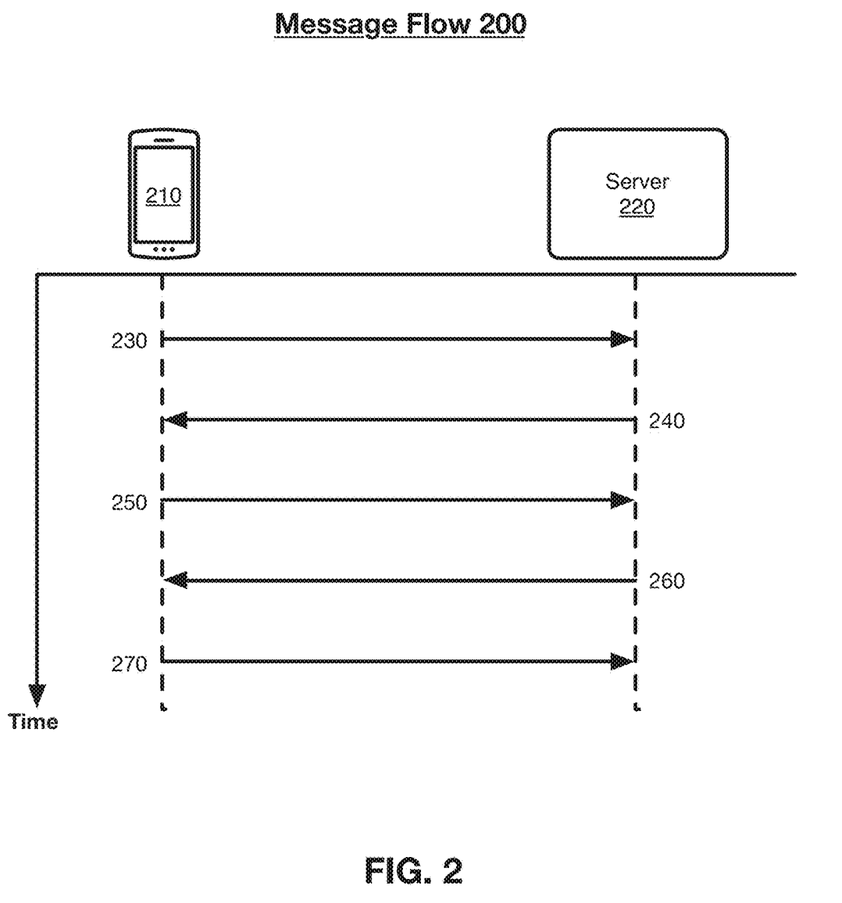
FIG. 2 illustrates a message flow according to an embodiment.

FIG. 2 illustrates a message flow 200 according to an embodiment. As shown in FIG. 2, a mobile device 210 may communicate with a server 220. Mobile device 210 may be similar to one of mobile devices 120, discussed above. Further, server 220 may be similar to server 130, discussed above. At 230, a server 220 may receive a request to establish a VPN from mobile device 210. Once such a request is received, server 220 may determine whether there are at least two network interfaces available at mobile device 210. If at least two network interfaces are not available, server 220 may wait for further requests 230 from mobile device 210. However, if at least two network interfaces are available at mobile device 210, message flow 200 may continue at 240.

At 240, the server 220 may send a message to mobile device 210 to configure the mobile device to send a request for a data item to be sent through a VPN. Also at 240, the server 220 may start a timer, which tracks a time period for which the mobile device 210 takes to send the request for a data item. In this manner, server 220 may determine that, after a predetermined period time, a request will not be received. In one example, a predetermined time period of three seconds may be used, however, any time period may be used. For example, the predetermined period of time may be configured based upon a time that it should take a request to arrive at the server 220 from the mobile device 210 over an optimal network connection. The optimal network connection may be determined based upon a bandwidth, type of network, strength of reception signal, and the like. For example, for a WLAN connection at an available upload bandwidth of 1 MBPS, the predetermined period of time may be up to 1 millisecond. In another example, the predetermined time period may be set by a network provider (i.e., a cellular carrier providing service to the mobile device).

At 250, a message may be sent from mobile device 210 to server 220. The message may include a data request, or one or more data items, and may be accompanied by an IP address generated through a domain name system (DNS), for example. In some embodiments, the IP address, which may be the result of a DNS request that is translated into an IP address by a server, may be updated each time the data item is received to prevent caching. When a message is received at 250, the server 220 may determine that the mobile device 210 is currently connected to a network through a preferred network interface. However, if the data item is not received within a predetermined period of time, as determined by the timer started at 240, the server 220 may determine that the current connection of mobile device 210 to a network is not implemented through the preferred network interface.

In exemplary embodiment, a VPN connection may be implemented through a 3G interface, however, a Wi-Fi interface may be available on mobile device 210 and may be a preferred network interface of mobile device 210. In this example, when a message is sent from mobile device 210 to server 220 at 250, the message may be sent over the Wi-Fi interface because it is the preferred network interface. However, since the VPN is implemented using the 3G interface, the message will not reach server 220, which may be connected using the VPN. Thus, the timer will reach a predetermined time period, such as three seconds in one example. Once the predetermined time period has been reached, server 220 may determine that the message requested from mobile device 210 was sent over a different, preferred, network interface than the current network interface implemented a VPN connection.

Further, the server 220 may determine based upon a received IP address that the current connection of mobile device 210 to a network is not implemented through the preferred network interface. When a preferred network is detected, but either a response is not received at server 220 within a predetermined period of time, or a response is received and an IP address indicates that the response was not sent using a preferred network, server 220 may initiate a VPN disconnection at 260.

At 260, the server 220 may send a message, such as a control packet of a VPN protocol, which initiates a disconnection of the VPN to permit the VPN to reconnect to a network through a preferred network interface, such as Wi-Fi. In this manner, a VPN connection may be disconnected and automatically reconnected using an available preferred connection. For example, a mobile device may be configured using an operating system, application, or otherwise, to establish new connections, such as a VPN connection, over a preferred network interface, when available. Further, a mobile device may be configured to automatically attempt to re-establish a VPN connection when the VPN connected is disconnected. Thus, while a VPN may be initially established using a non-preferred network interface, once a preferred network interface, such as Wi-Fi, is made available to a mobile device, disconnecting the VPN connection may trigger a reconnection using the preferred network interface.

At 270, the server 220 may receive a message from mobile device indicating the VPN has been connected using the preferred connection. At this stage, the server 220 may be configured to store information about the mobile device 210, such as the network interface through which a message or data item has been received. In an example, server 220 may store such information in a database, such as database 160 discussed above. In other embodiments, this information may be stored at any of the previous stages, such as upon receipt of messages 230 and/or 250.

Figure 3:
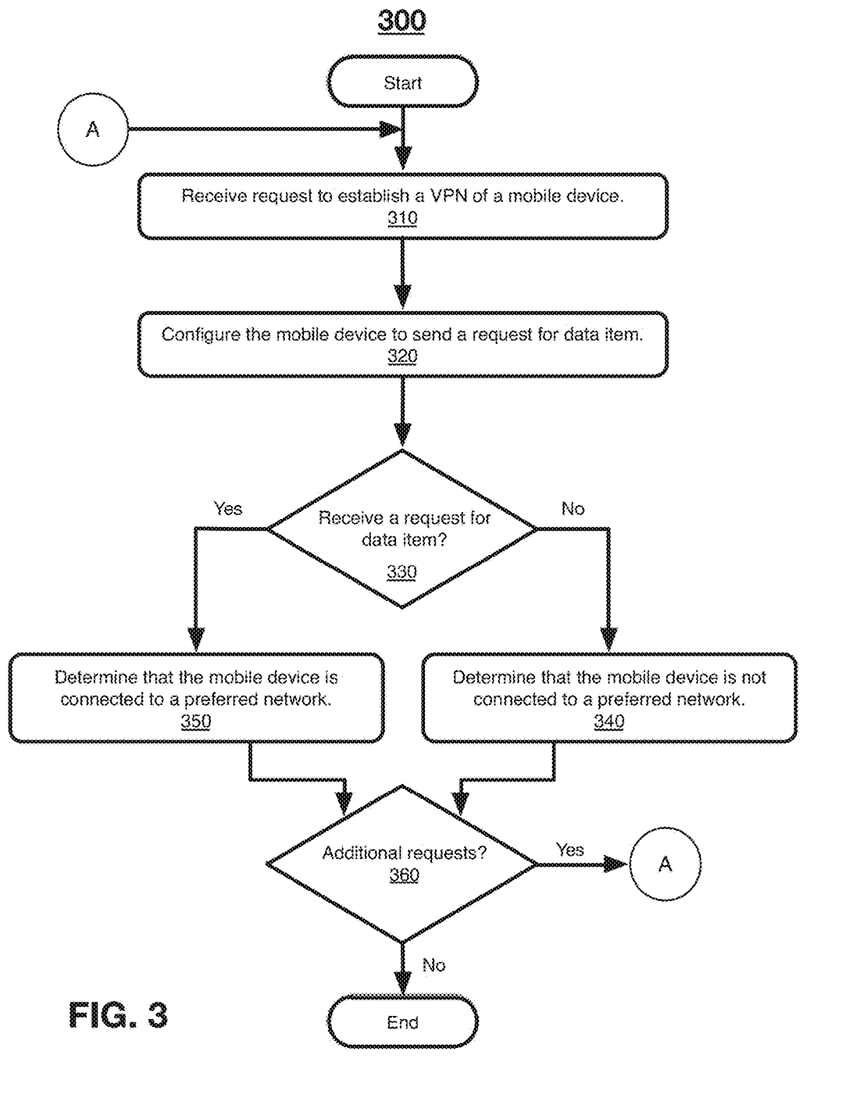
FIG. 3 illustrates a logic flow according to an embodiment.

FIG. 3 depicts an exemplary and non-limiting embodiment 300 of the supervision scheme of a VPN of a mobile device 120 that may be configured to be connected through a plurality of network interfaces according to one embodiment. The operation starts when the server 130 receives at 310 a request to establish the VPN of the mobile device 120 for example, mobile device 120-1. At 320, the server 130 may configure the mobile device 120-1 to send a request for a data item to be sent through the VPN. At 330, it may be checked whether a request for the data item is received, and if so, execution continues at 350; otherwise, execution may continue at 340. At 340, the server 130 may determine that the mobile device 120-1 is not connected to a preferred network interface. According to this embodiment, the server 130 may disconnect the VPN to permit the VPN to reconnect to the network 110 through the preferred network interface. At 350, the server 130 may determine that the mobile device 120-1 is connected to the preferred network interface.

It should be noted that the server 130 may be configured to store in the database 160 information for further use respective of the mobile device 120-1. As an example, such information may be a type of the network interface through which the data item is sent. In an embodiment, a type of network interface may be detected based upon one or more techniques described herein. For example, as described above, a server may determine that a current VPN of a mobile device is implemented over a cellular connection based upon information, such as an IP address, communicated between the mobile device and the server. The server may request a message from the mobile device. If a preferred network interface, such as Wi-Fi, is available on the mobile device, the mobile device may be configured to send messages over such a preferred network interface. In this manner, a response from the mobile device to the server may be sent over the preferred network interface instead of through the VPN, which may be connected over a non-preferred network interface. When a response is not received by the server within a predetermined period of time, it may be determined that the mobile device is connected to a preferred network interface, such as Wi-Fi. When a response is received by the server within the predetermined period of time, it may be determined that the mobile device is connected using a non-preferred network interface, such as 3G. The type of network interface detected may be stored in a database for further use.

In another embodiment, an agent may be installed and executed on the mobile device 120 continuously, intermittently, or responsive of user activation. The agent may be an application installed on the mobile device 120 and executed thereon. In accordance with this embodiment, the agent may be communicatively connected to the server 130 through the network 110. The agent may be configured to track traffic transmitted through a network interface on the mobile device 120 when a VPN connection is operable. The traffic may be analyzed to determine the type of the current network interface. Such analysis may include identification of an internal IP address designed in data packets included in the analyzed traffic. Such an IP address may be used as a unique identifier, which may be assigned to network interfaces for communications and may define the type of the network interface. Therefore, the identification of the internal IP address may be used to determine the type of current network interface currently being used by the mobile device 120. In an embodiment, the agent may be configured to periodically detect a network interface of the mobile device using one of the techniques describes herein and/or may be configured to detect a network interface using one of the techniques herein when the mobile device connects to a network interface. The type of network interface detected may be stored in a database for further use.

In an embodiment, information stored in a database may be used by a server to dynamically provide services or data to a mobile device based upon a type of network interface used to connect to the server. In an example, each request made by a mobile device may be labeled with a detected network interface, such as cellular or Wi-Fi, and stored by the server. The detected network interface for a mobile device may be used by the server to maintain a server-side state for the mobile device. By maintaining a state for the mobile device identifying a type of network interface, the server may determine content or services to provide to the mobile device. In one example, media such as video, audio, text, or image content may be delivered to a mobile device in various formats based upon a type of detected network interface. When an interface that is known to be limited, such as 3G, is detected, content may be sent in compressed form, or in file formats of smaller size. However, when a higher-bandwidth interface, such as Wi-Fi, is used, a server may deliver uncompressed, or higher quality, content to a mobile device. Likewise, a detected network interface may be used to provide updates to a mobile device. For example, updates may be sent to a mobile device from a server only when a preferred network interface has been detected. In this manner, mobile devices may be maintained and updated while optimizing the time and cost associated with such updates.

At 360, it may be checked whether there are additional requests, and if so, execution may continue at 310; otherwise, execution may terminate.

Figure 4:
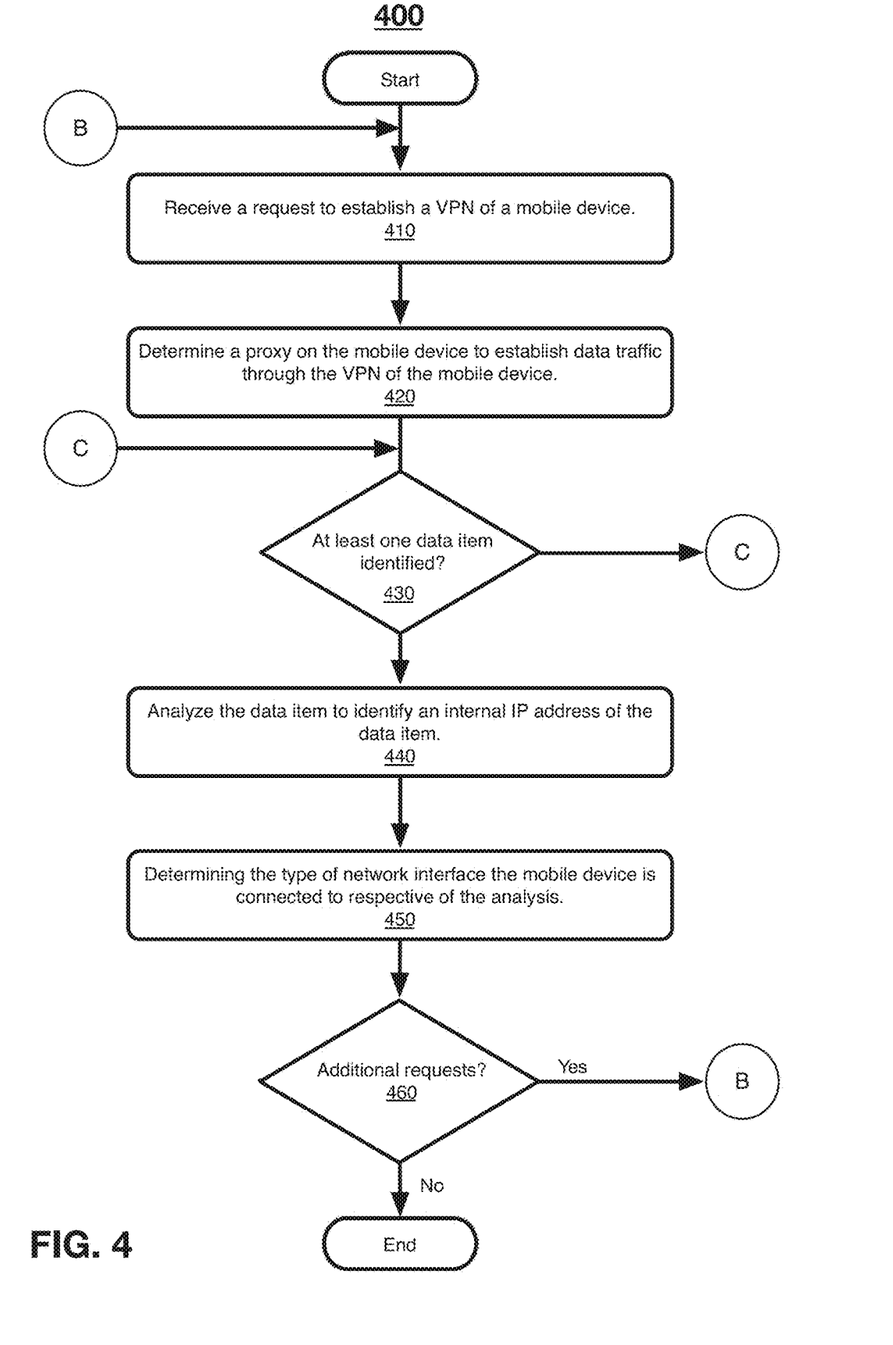
FIG. 4 illustrates a logic flow according to an embodiment.

FIG. 4 depicts an exemplary and non-limiting embodiment 400 describing the process of monitoring traffic of one or more data items transmitted through a VPN of a mobile device 120 according to one embodiment. The method starts at 410 when a request to establish the VPN connection of a mobile device 120 may be received. As an example, such a request may be received from the mobile device 120-1. At 420, the server 130 may determine a proxy on the mobile device 120-1 to permit the traffic of one or more data items to be routed through the VPN. However, it can be appreciated that, in some embodiments as described herein, a proxy may not be used. At 430, it may be checked whether at least one data item is identified, and if so, execution may continue at 440; otherwise, execution may continue at 430. At 430, the server 130 may analyze the data item to identify an IP address of the data item, and more specifically, an internal IP address of the data item. The internal IP address may imply on a type of the current network interface through which the data item is sent. Therefor analysis of such IP address may be used to identify when the mobile device 120-1 has switched to another network interface. At 450, the server 130 may determine the type of network interface that the mobile device 120-1 is connected to respective of the analysis made at 440. At 460 it may be checked whether there are additional requests, and if so, execution may continue at 410; otherwise, execution may terminate. According to this embodiment, the server 130 may disconnect the VPN from a current network interface to permit the VPN to reconnect through a preferred network interface, while such interface is available.

Figure 5:
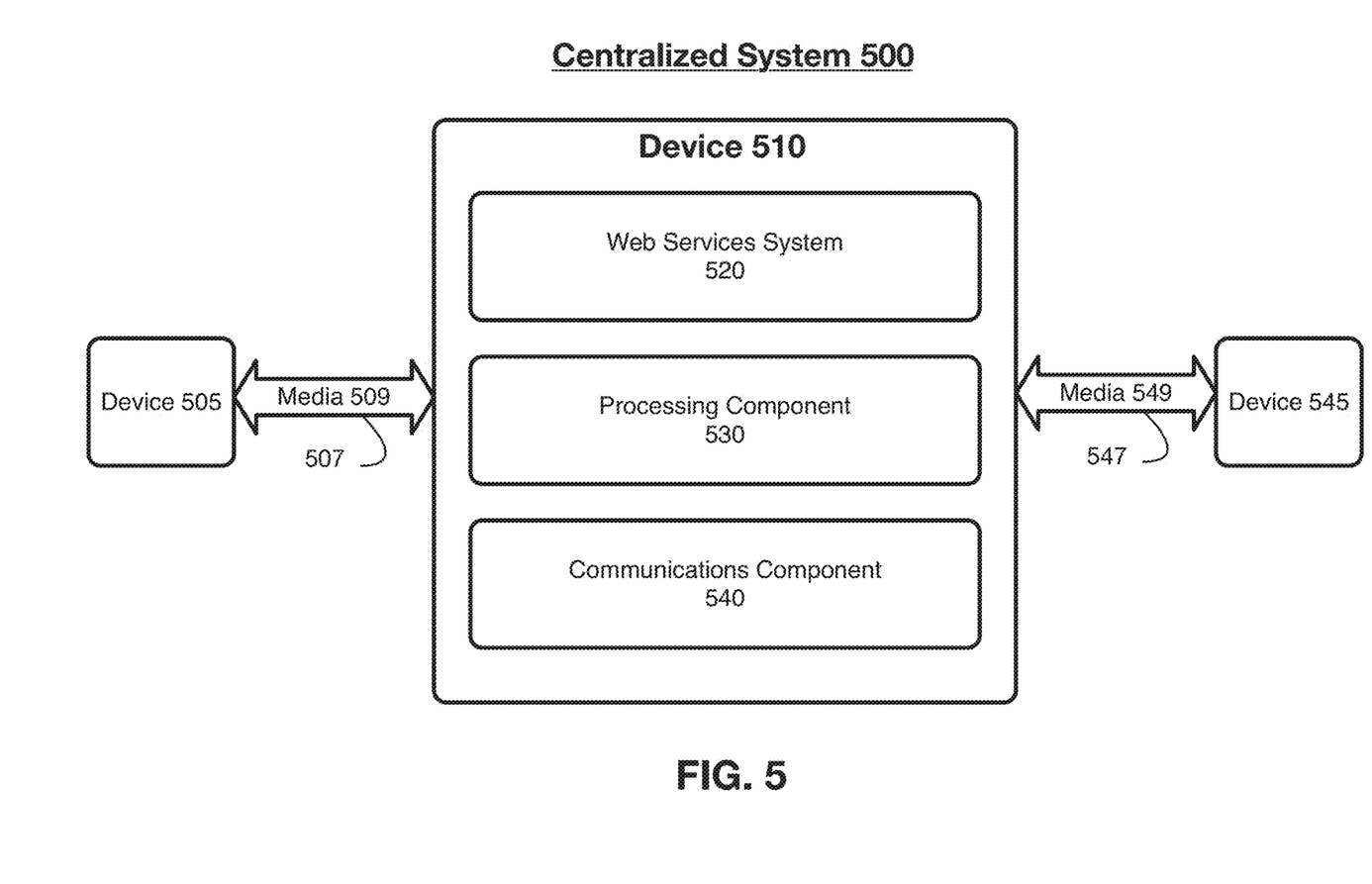
FIG. 5 illustrates a centralized system according to an embodiment.

FIG. 5 illustrates a block diagram of a centralized system 500. The centralized system 500 may implement some or all of the structure and/or operations for the web services system 520 in a single computing entity, such as entirely within a single device 510.

The device 510 may comprise any electronic device capable of receiving, processing, and sending information for the web services system 520. Examples of an electronic device may include without limitation a computer, a personal computer (PC), a desktop computer, a laptop computer, a notebook computer, a netbook computer, a handheld computer, a tablet computer, a server, a server array or server farm, a web server, a network server, an Internet server, a work station, a main frame computer, a supercomputer, a network appliance, a web appliance, a distributed computing system, multiprocessor systems, processor-based systems, wireless access point, base station, subscriber station, radio network controller, router, hub, gateway, bridge, switch, machine, or combination thereof. The embodiments are not limited in this context.

The device 510 may execute processing operations or logic for the web services system 520 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 510 may execute communications operations or logic for the web services system 520 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 509, 549 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 510 may communicate with other devices 505, 545 over a communications media 509, 549, respectively, using communications signals 507, 547, respectively, via the communications component 540. The devices 505, 545, may be internal or external to the device 510 as desired for a given implementation. Examples of devices 505, 545 may include, but are not limited to, a mobile device, a personal digital assistant (PDA), a mobile computing device, a smart phone, a telephone, a digital telephone, a cellular telephone, ebook readers, a handset, a one-way pager, a two-way pager, a messaging device, consumer electronics, programmable consumer electronics, game devices, television, digital television, or set top box.

For example, device 505 may correspond to a client device such as a phone used by a user. Signals 507 sent over media 509 may therefore comprise communication between the phone and the web services system 520 in which the phone transmits a request and receives a web page in response.

Device 545 may correspond to a second user device used by a different user from the first user, described above. In one embodiment, device 545 may submit information to the web services system 520 using signals 547 sent over media 549 to construct an invitation to the first user to join the services offered by web services system 520. For example, if web services system 520 comprises a social networking service, the information sent as signals 547 may include a name and contact information for the first user, the contact information including phone number or other information used later by the web services system 520 to recognize an incoming request from the user. In other embodiments, device 545 may correspond to a device used by a different user that is a friend of the first user on a social networking service, the signals 547 including status information, news, images, or other social-networking information that is eventually transmitted to device 505 for viewing by the first user as part of the social networking functionality of the web services system 520.

Figure 6:
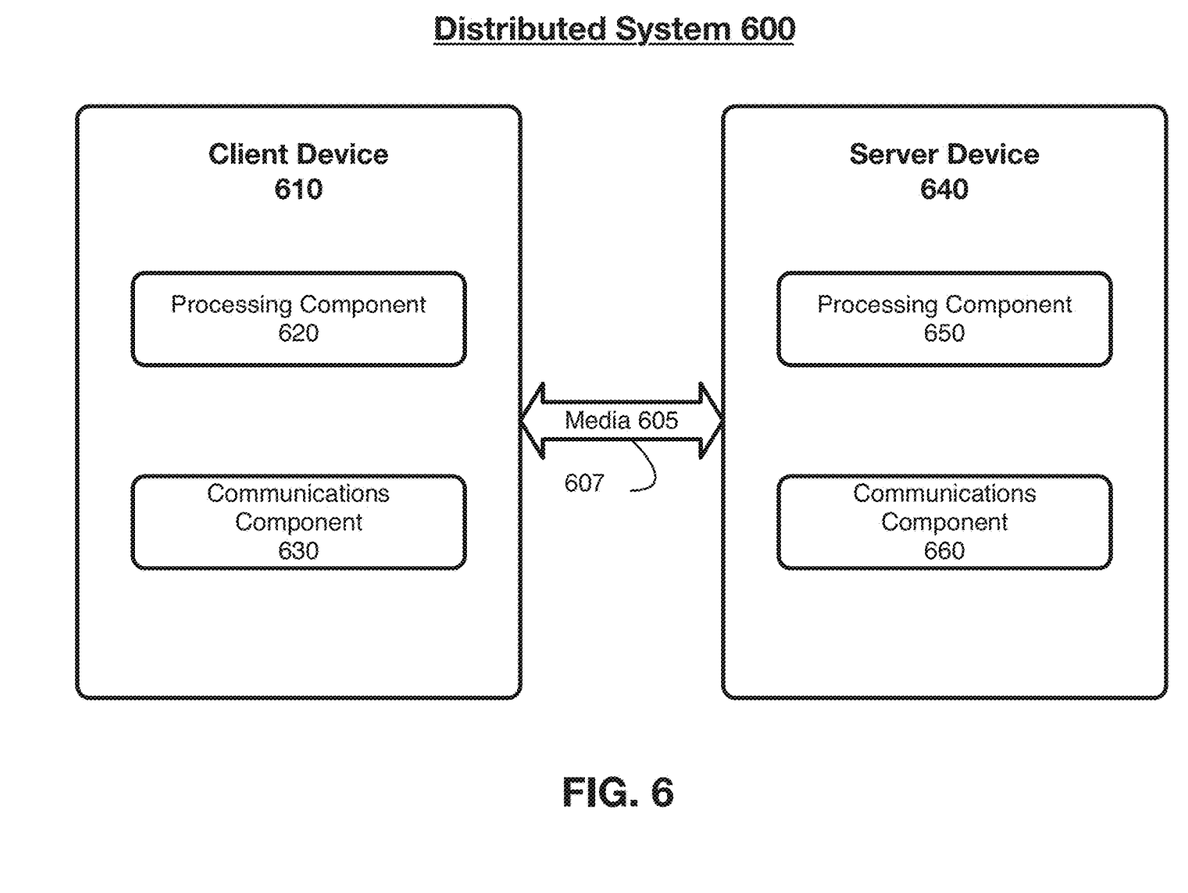
FIG. 6 illustrates a distributed system according to an embodiment.

FIG. 6 illustrates a block diagram of a distributed system 600. The distributed system 600 may distribute portions of the structure and/or operations for the disclosed embodiments across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 610 and a server device 640. In general, the client device 610 and the server device 640 may be the same or similar to device 510 as described with reference to FIG. 5. For instance, the client device 610 and the server device 640 may each comprise a processing component 620, 650 and a communications component 630, 660 which are the same or similar to the processing component 530 and the communications component 540, respectively, as described with reference to FIG. 5. In another example, the devices 610 and 640 may communicate over a communications media 605 using media 605 via signals 607.

The client device 610 may comprise or employ one or more client programs that operate to perform various methodologies in accordance with the described embodiments. In one embodiment, for example, the client device 610 may implement some steps described with respect client devices described in the preceding figures.

Figure 7:
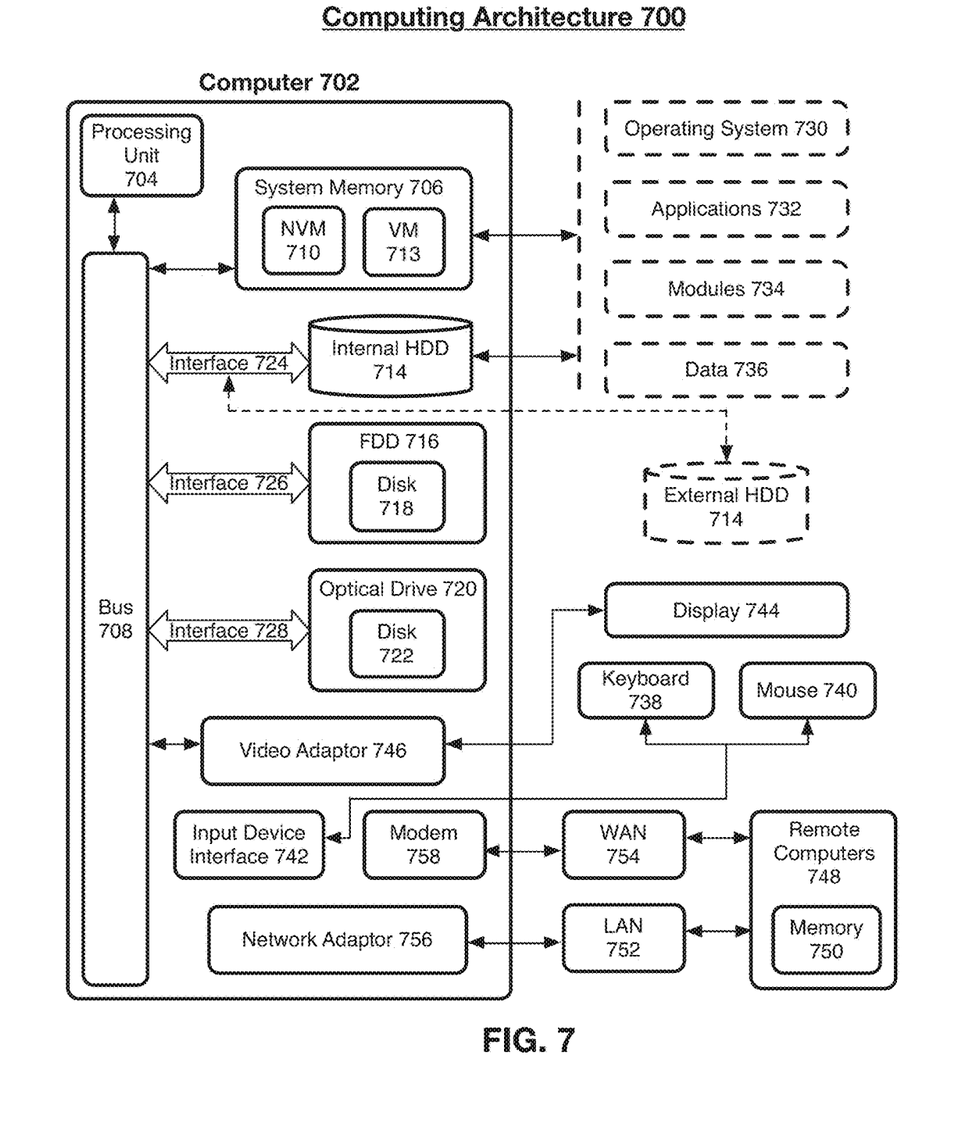
FIG. 7 illustrates a computing architecture according to an embodiment.

The server device 640 may comprise or employ one or more server programs that operate to perform various methodologies in accordance with the described embodiments. In one embodiment, for example, the server device 640 may implement some steps described with respect to server devices described in the preceding figures FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 713. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM, DVD, or Blu-ray). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 713, including an operating system 730, one or more application programs 732, other program modules 734, and program data 736. In one embodiment, the one or more application programs 732, other program modules 734, and program data 736 can include, for example, the various applications and/or components to implement the disclosed embodiments.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A display 744 is also connected to the system bus 708 via an interface, such as a video adaptor 746. The display 744 may be internal or external to the computer 702. In addition to the display 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
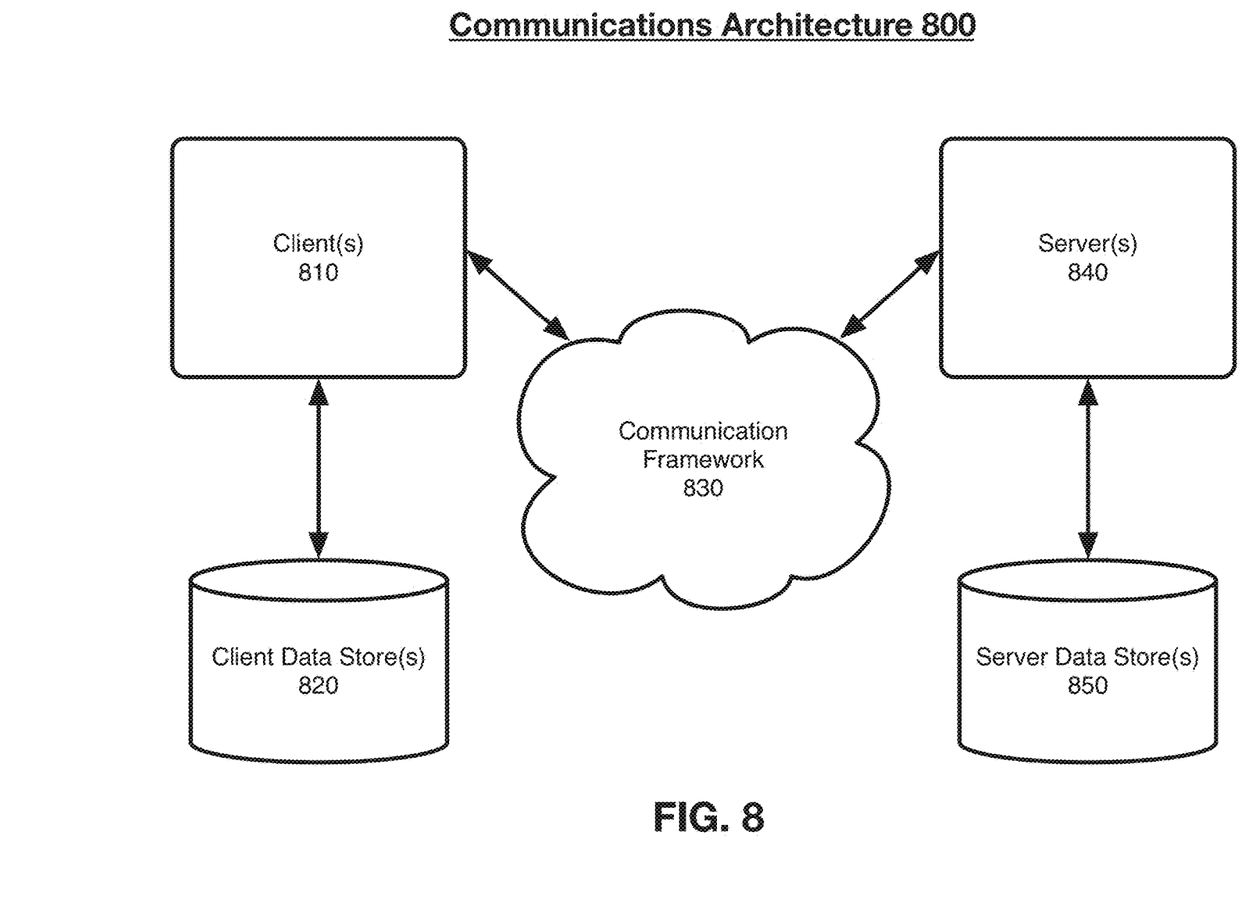
FIG. 8 illustrates a communications architecture according to an embodiment.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 810 and servers 840.

The clients 810 may implement the client device 810, for example. The servers 840 may implement the server device 840, for example. The clients 810 and the servers 840 are operatively connected to one or more respective client data stores 820 and server data stores 850 that can be employed to store information local to the respective clients 810 and servers 840, such as cookies and/or associated contextual information.

The clients 810 and the servers 840 may communicate information between each other using a communication framework 830. The communications framework 830 may implement any well-known communications techniques and protocols. The communications framework 830 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 830 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 810 and the servers 840. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The principles of the invention are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the invention may be achieved without departing from the scope of the disclosed invention. All such embodiments are included herein. The scope of the invention should be limited solely by the claims thereto.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method comprising:
   receiving a request at a server to establish a virtual private network (VPN) of a mobile device;
   configuring the mobile device by the server to send a request for a data item through the VPN;
   determining that the VPN is connected to a network interface of the mobile device other than a certain type of network interface when the request for the data item is not received by the server;
   determining whether the VPN is connected to the certain type of network interface when the request for the data item is received by the server; and
   disconnecting the VPN from a current network interface when the VPN is not connected to the certain type of network interface to permit the VPN to reconnect to the preferred network interface.

2. The computer-implemented method of claim 1, wherein the received request for the data item includes a data item accompanied by an IP address generated through a domain name system (DNS.

3. The computer-implemented method of claim 2, wherein the IP address is updated each time the data item is received to prevent caching.

4. The computer-implemented method of claim 1, further comprising, determining that the VPN is connected to a network interface of the mobile device other than the certain type of network interface when the request for the data item is not received by the server within a predetermined period of time.

5. The computer-implemented method of claim 1, wherein the mobile device configuration further comprising causing the mobile device to use a proxy auto-config (PAC) when searching for at least one proxy as a result of the request for the data item.

6. The computerized method of claim 1, further comprising maintaining in a database one or more of a type of the network interface used for the VPN or a received data item.

7. An article comprising a non-transitory computer-readable storage medium including instructions that, when executed on a computing device, performs a computer-implemented method comprising:
   receiving a request at a server to establish a virtual private network (VPN) of a mobile device;
   configuring the mobile device by the server to send a request for a data item through the VPN;
   determining that the VPN is connected to a network interface of the mobile device other than a certain type of network interface when the request for the data item is not received by the server;
   determining whether the VPN is connected to the certain type of network interface when the request for the data item is received by the server; and
   disconnecting the VPN from a current network interface when the VPN is not connected to the certain type of network interface to permit the VPN to reconnect to the certain type of network interface.

8. A system comprising:
   a memory including executable instructions; and
   a processor communicatively connected to the memory, the processor is configured to execute the instructions, thereby causing the processor to:
   receive a request at a server to establish a virtual private network (VPN) of a mobile device;
   configure the mobile device by the server to send a request for a data item through the VPN;
   determine that the VPN is connected to a network interface of the mobile device other than a certain type of network interface when the request for the data item is not received by the server;
   determine whether the VPN is connected to the certain type of network interface when the request for the data item is received by the server; and
   disconnect the VPN from a current network interface when the VPN is not connected to the certain type of network interface to permit the VPN to reconnect to the certain type of network interface.

9. The system of claim 8, wherein the the received request for the data item includes a data item accompanied by an IP address generated through a domain name system (DNS.

10. The system of claim 9, wherein the IP address is updated each time the data item is received to prevent caching.

11. The system of claim 8, further comprising, determining that the VPN is connected to a network interface of the mobile device other than the certain type of network interface when the request for the data item is not received by the server within a predetermined period of time.

12. The system of claim 8, wherein the mobile device configuration further comprising causing the mobile device to use a proxy auto-config (PAC) when searching for at least one proxy as a result of the request for the data item.

13. The system of claim 8, wherein the at least one mobile device is any of a smartphone or a tablet personal computer (PC).

14. The system of claim 8, wherein a network interface is to a wireless network, a cellular network, a wired network, or a combination thereof.

15. The system of claim 14, wherein the cellular network is any of a code division multiple accesses (CDMA), a global system for mobile communications (GSM), a 3$^{rd}$ generation mobile telecommunications (3G), or a long-term evolution (LTE) cellular network.

16. The system of claim 8, further comprising a database for maintaining one or more of a type of the network interface used for the VPN or a received data item.

17. A computer-implemented method comprising:
   establishing data traffic with a server through a VPN of a mobile device;
   identifying by the server one or more data items transmitted through the VPN of the mobile device;
   analyzing, by the server, the one or more data items to identify an internal IP address of the one or more data items;
   determining whether the VPN is connected to a certain type of network interface of the mobile device based upon the internal IP address; and
   disconnecting the VPN from a current network interface when the VPN is not connected to the certain type of network interface to permit the VPN to reconnect to the certain type of network interface.

18. The computer-implemented method of claim 17, wherein the internal IP address is changed when a type type of network interface through which the mobile device is changed.

19. The computer-implemented method of claim 17, further comprising:
   maintaining a type of network interface used for the VPN in a database for further use.

* * * * *